March 6, 1951     J. C. RICHARDSON     2,544,109
PIPE CONNECTION
Filed May 22, 1948     2 Sheets—Sheet 1
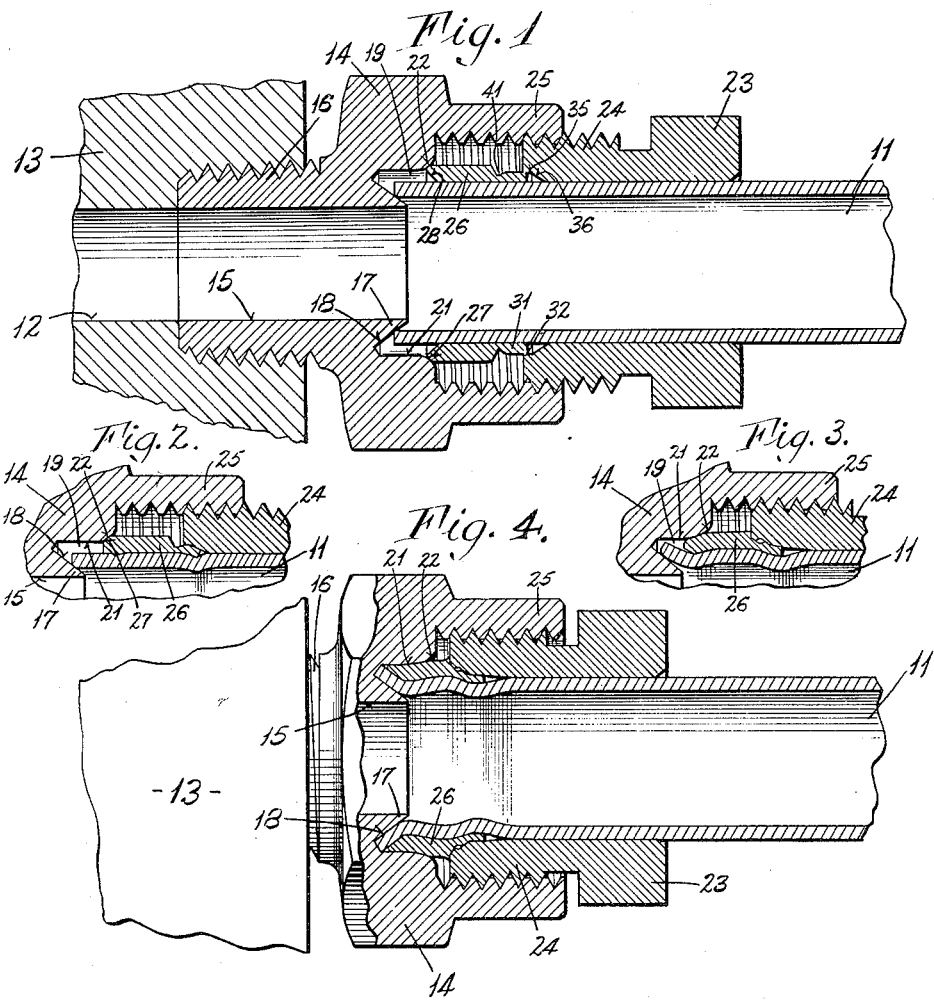
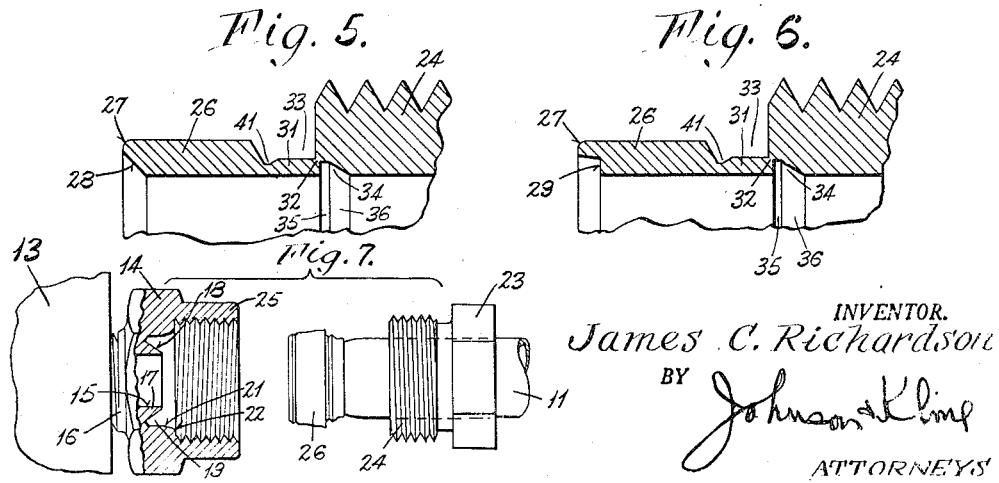
INVENTOR.
James C. Richardson
BY Johnson Kling
ATTORNEYS March 6, 1951 — J. C. RICHARDSON — 2,544,109
PIPE CONNECTION
Filed May 22, 1948 — 2 Sheets-Sheet 2
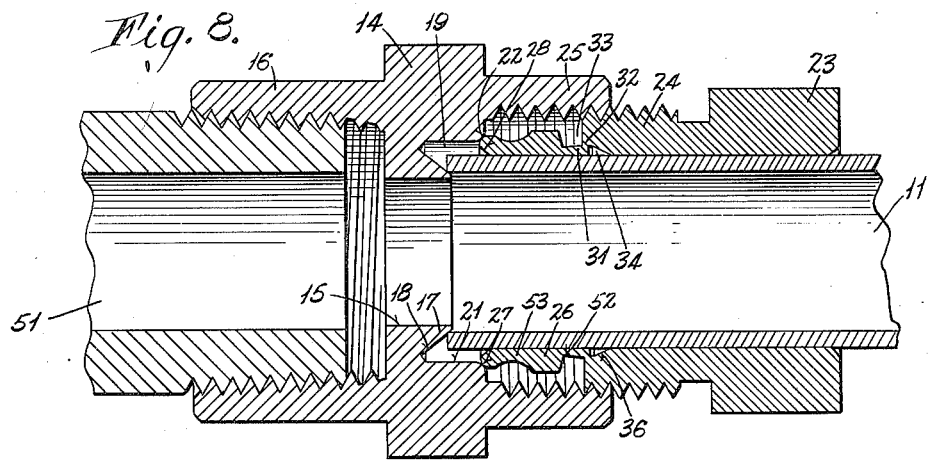
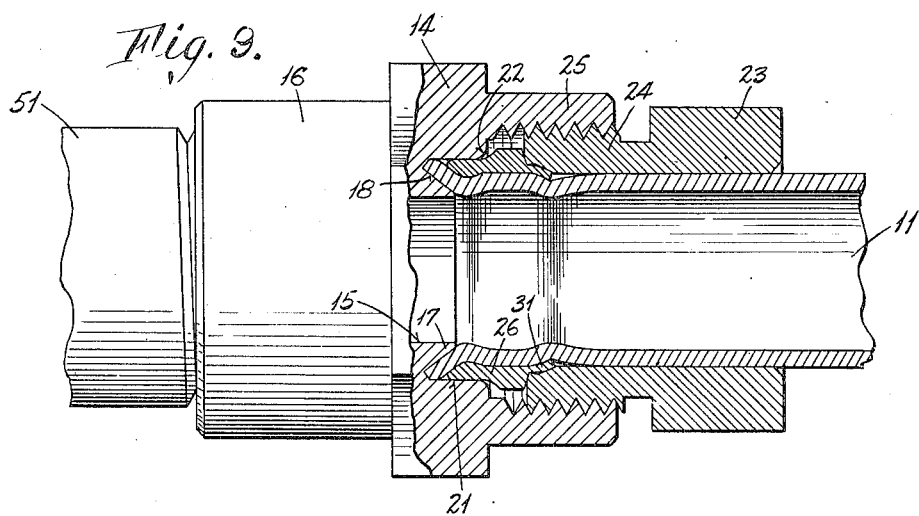
INVENTOR.
James C. Richardson
BY Johnson & Kline
ATTORNEYS Patented Mar. 6, 1951

2,544,109

UNITED STATES PATENT OFFICE 2,544,109

PIPE CONNECTION

James C. Richardson, Waterbury, Conn., assignor to The Brockway Company, Naugatuck, Conn., a corporation of Connecticut Application May 22, 1948, Serial No. 28,651

4 Claims. (Cl. 285—86)

This invention relates to pipe couplings of the so-called self-flaring type used in connecting ductile or flexible pipes and tubes to openings in various types of mechanisms. Such couplings are disclosed, for example, in my co-pending application, Serial No. 727,242, filed February 7, 1947, of which the present application is a continuation in part.

In this type of coupling a tube-locking ferrule and nut are originally connected by a frangible section which is sheared when the nut is tightened in making up the tube connection. Thereafter the sheared end of the ferrule telescopes within the nut bore to be compressed radially against the tube, thus producing clamping pressure and forming a circumferential corrugation in the tube wall which joins the tube to the ferrule. Further advancement of the nut and ferrule into the filling then extrudes the tube end inwardly around a conical tube-flaring mandrel surface against which it is locked by the forward end of the ferrule.

An object of this invention is to provide a coupling or fitting of the above type constructed and arranged to reduce to a minimum the torque required to shear the frangible section originally connecting the ferrule and the locking nut.

A further object is to provide a self-flaring coupling in which the telescoping movement of the ferrule into the nut bore is so guided as to prevent misalignment of the parts occasioned by cocking of the ferrule.

A further object is to provide a coupling constructed and arranged to reduce to a minimum the force needed to compress the web of the ferrule into the associated tube so as to forestall rotation of the ferrule and twisting of the associated tube during make-up of the coupling.

A still further object is to provide a self-flaring coupling so designed that the clamping pressure of the ferrule on the flared tube end is so distributed that the tube end cannot be pinched off.

A still further object is to provide a coupling capable of making a tight connection even after repeated disassembly and reassembly of the parts in actual use.

These and other objects which will be apparent are accomplished by the invention hereafter described and illustrated in the accompanying drawings in which—

Figure 1 is a sectional view through a self-flaring coupling constructed in accordance with one embodiment of this invention, showing the parts operatively assembled with a tube and the bore of an associated mechanism to which the tube is to be connected, the parts being shown at the beginning of the coupling operation.

Figs. 2 and 3 are partial sectional views illustrating successive steps in making up the coupling shown in Fig. 1.

Fig. 4 is a section similar to Fig. 1 showing the positioning of the parts at the end of the coupling operation.

Figs. 5 and 6 are partial sections illustrating different ways of shaping the mouth of the tube-clamping ferrule.

Fig. 7 is an elevation, partly in section, and on a smaller scale of the coupling disassembled after use, and Figs. 8 and 9 are views similar to Fig. 1 of a modified form of coupling, which is preferred when the parts are made of less ductile metal such as steel or stainless steel; said figures respectively illustrating the same before and after make-up of the coupling.

The coupling illustrated in Figs. 1 to 6 is arranged to connect a ductile pipe or tube 11 to a bore 12 formed in any desired mechanism 13, and comprises a main fitting or body member 14 having a flow hole 15 extending therethrough and a threaded stud 16 or the like for connection with the associated mechanism.

The body member 14 is formed with a mandrel 17 having a conical tube-flaring face 18 surrounded by a flare cavity 19 between the tube-flaring surface and a cylindrical barrel surface 21 which extends axially beyond the end of the mandrel and terminates in a rounded holding face 22, the purpose of which will be apparent hereafter.

A hollow backing nut 23 has an extension 24 threaded within a cylindrical extension 25 on the fitting or body member 14. The backing nut as made is integral with a tube clamping ferrule 26 formed at its forward end with a holding surface 27 adapted to cooperate with the body holding surface 22. The ferrule has a countersunk mouth formed by a bevelled countersunk face 28, see Fig. 5 or a stepped countersunk face 29, see Fig. 6, or the like. The countersunk face preferably forms an angle with the coupling axis which is slightly less than the angle formed by the mandrel face 18.

The ferrule includes a reduced tubular portion 31 of reduced cross-section connected to the backing nut by a frangible section 32 formed by and between an outer recess 33 in the ferrule and an inner recess 34 in the bore of the nut, see Figs. 5 and 6. The inner recess is formed with a substantially cylindrical face 35 immediately adjacent to the frangible section 32, and with a conical face 36 between the cylindrical face and the bore of the unit. The outer recess 33 is formed so that the outer face of the portion 31 and the face 35 forming the bottom of the inner recess are substantially on a common cylindrical plane, with the result that shearing of the frangible section, as hereinafter described, occurs along such cylindrical plane in a substantially axial direction. As a result, shearing of the frangible section to separate the ferrule from the backing nut is accomplished with the least possible torque.

The present invention also includes means for reducing to a minimum the force needed to compress the ferrule neck 31 into clamping engagement with the tube 11. This is done by weakening the ferrule section at the forward end of the neck 31. In the modification shown in Figs. 1 to 6 a weakening groove 41 is formed at the forward end of the neck 31. Preferably this weakening groove is formed with a forward face at an angle of 30° to a plane perpendicular to the axis of the coupling, and a rearward face at an angle of 60° thereto.

In Figs. 8 and 9, a modified embodiment of the invention is shown in a coupling used to connect the tube 11 to a pipe 51, for example, and this embodiment is especially adapted to be formed of such material as steel, or the like. In this form, the weakened area between the body of the ferrule 26 and the neck 31 is produced by forming the outer surface of the neck, in other words, the bottom of the outer recess 33, on a taper having its minimum diameter 52 at the point corresponding to the location of the weakening groove 41.

In the coupling shown in Figs. 8 and 9, the outer diameter of the ferrule 26 is reduced just to the rear of the holding surface 27 to provide a section 53 having a diameter substantially equal to that of the barrel face 21 in the body member 14 in order to reduce the tendency of the ferrule to expand or bulge outwardly and prevent over-compression of the ferrule and tube end.

In operation, assuming that the parts are in the positions shown in Figs. 1 and 8, tightening the backing nut 23 causes the holding surfaces 22 and 27 to engage with sufficient force to hold the ferrule 26 against rotation and cause the frangible section 32 to shear longitudinally along a substantially cylindrical surface parallel to the coupling axis, with the result that the outer cylindrical wall of the end of the neck 31 telescopes within the cylindrical surface 35 to form a supporting and interfitted rotary connection between the nut and ferrule which prevents the latter from cocking at an angle.

As a result of the weakened section in the ferrule at the end of the neck 31, caused by the groove 41 in the coupling shown in Figs. 1 to 6, or the tapered surface of the web 31 as shown in Figs. 8 and 9, further advancement of the backing nut causes the neck 31 to bend inwardly through engagement with the conical face 36 in the nut bore, see Figs. 1 and 2, virtually hinging about the connection of the neck to the thicker and stiffer part of the ferrule, so that the torque required to compress the ferrule is insufficient to rotate the ferrule against the resistance of the holding surfaces 22 and 27. This results in part from the fact that the rear wall of the weakening groove in Figs. 1 to 6 is at such an angle, for example, the angle of 60° above referred to, that sufficient stock has been removed from the web to prevent such jamming of material into the nut bore as would otherwise tend to lock the ferrule to the nut against relative rotation.

Engagement of the advancing end of the nut 22 with the ferrule face formed at an angle of 30° tends to force that portion of the ferrule inwardly to increase the bite on the tube. At the same time such engagement forces the holding surface 27 on the ferrule past the body holding surface 22 and within the barrel opening 21, compressing the forward end of the ferrule and forming an additional corrugation in the tube. The ferrule being locked to the tube the latter is fed forwardly over the mandrel surface 18, extruding the tube end into a flare until it seats in the bottom of the recess 19. The ferrule then slides forward somewhat producing sufficient deformation to lock the tube in place. The countersunk opening at the front of the ferrule being at an angle slightly less acute than the angle of the mandrel surface 18, facilitates and insures this tube locking operation by filling the recess 19 and pressing on the tube with a locking pressure extending over a considerable area so that the tube end is not pinched off. As shown in Fig. 7, the present invention permits the use of a ferrule of such length as to permit repeated disassembly and reassembly of the parts, inasmuch as a new sealing pressure can be applied against the flared tube end an indefinite number of times.

While the device as shown in Figs. 1 to 7 may be made of materials of various hardnesses and ductility to function satisfactorily with tubes of various hardnesses and ductility, when for any reason the fitting is more advantageously made of steel or similar relatively non-ductile material, it is preferable to employ the construction shown in Figs. 8 and 9 in which the conformation of the ferrule there illustrated permits proper functioning of the several parts as above explained with a minimum of metal displacement or flow.

It will be apparent that the invention can be variously modified and adapted within the scope of the appended claims.

I claim:

1. In a pipe coupling having means for flaring a ductile pipe over a flare-forming projection on a body member upon operation of a draft member having a screw-thread connection with the body member, said means including a sleeve to grip the pipe and advance therewith in the flaring operation and clamp the flared end of the pipe against said flare-forming projection in leak-proof engagement therewith, said sleeve having a frangible connection with said draft member formed by a web left between spaced internal and external annular recesses in the sleeve whereby when said frangible web is broken a part of the sleeve engages a sloping wall of the internal recess and telescopes with a draft member to grip the pipe, the improvement which comprises a groove in the external recess portion of the sleeve spaced from said frangible web and forming a hinge portion to facilitate the contraction of the telescoping portion of the sleeve when the draft member advances relative to the broken web.

2. In a pipe coupling having means for flaring a ductile pipe over a flare-forming projection on a body member upon operation of a draft member having a screw-thread connection with the body member, said means including a sleeve to grip the pipe and advance therewith in the flaring operation and clamp the flared end of the pipe against said flare-forming projection in leak-proof engagement therewith, said sleeve having a frangible connection with said draft member formed by a web left between spaced internal and external annular recesses in the sleeve whereby when said frangible web is broken a part of the sleeve engages a sloping wall of the internal recess and telescopes with a draft member to grip the pipe, the improvement which comprises a cylindrical wall at the bottom of the internal recess and adjacent the frangible web providing a space into which the sheared-off end of the sleeve may move axially before it engages the sloping wall of the internal recess and begins to contract on the pipe.

3. In a pipe coupling having means for flaring a ductile pipe over a flare-forming projection on a body member upon operation of a draft member having a screw-thread connection with the body member, said means including a sleeve to grip the pipe and advance therewith in the flaring operation and clamp the flared end of the pipe against said flare-forming projection in leak-proof engagement therewith, said sleeve having a frangible connection with said draft member formed by a web left between spaced internal and external annular recesses in the sleeve whereby when said frangible web is broken a part of the sleeve engages a sloping wall of the internal recess and telescopes with a draft member to grip the pipe, said flare-forming projection being located in a cylindrical cavity in the body and said sleeve being forced in said cylindrical cavity by the displacement of the metal of the sleeve, the improvement which comprises an annular recess near the end of the sleeve which enters the cavity in the body to facilitate displacement of the metal of the sleeve when the latter is forced into said cavity.

4. In a pipe coupling having means for flaring a ductile pipe over a flare-forming projection on the body member upon operation of a draft member having a screw-threaded connection with the body member, said means including a sleeve to grip the pipe and advance therewith in the flaring operation and clamp the flared end of the pipe against said flare-forming projection in leak-proof engagement therewith, said sleeve having a frangible connection with said draft member formed by a web left between spaced internal and external annular recesses in the sleeve whereby when said frangible web is broken a part of the sleeve engages a sloping wall of the internal recess and telescopes with a draft member to grip the pipe, the improvement which comprises the sloping wall of the internal recess being axially spaced from the part of the sleeve which engages it to provide a space into which the sheared-off end of the sleeve may move axially before it engages the sloping wall of the internal recess and begins to contract on the pipe.

JAMES C. RICHARDSON.

REFERENCES CITED

The following references are of record in the file of this patent:

UNITED STATES PATENTS

| Number | Name | Date |
|---|---|---|
| 2,127,611 | Mueller | Aug. 23, 1938 |
| 2,128,459 | Guarnaschelli | Aug. 30, 1938 |
| 2,182,811 | Kocher | Dec. 12, 1939 |
| 2,466,057 | Somma | Apr. 5, 1949 |

FOREIGN PATENTS

| Number | Country | Date |
|---|---|---|
| 72,766 | Sweden | Feb. 7, 1928 |
| 309,529 | Italy | July 8, 1933 |